July 21, 1953  G. PRINCE  2,645,989
CULTIVATOR ATTACHMENT FOR TRACTORS
Filed March 20, 1950  2 Sheets-Sheet 1

INVENTOR
GERRIT PRINCE
ATTORNEYS

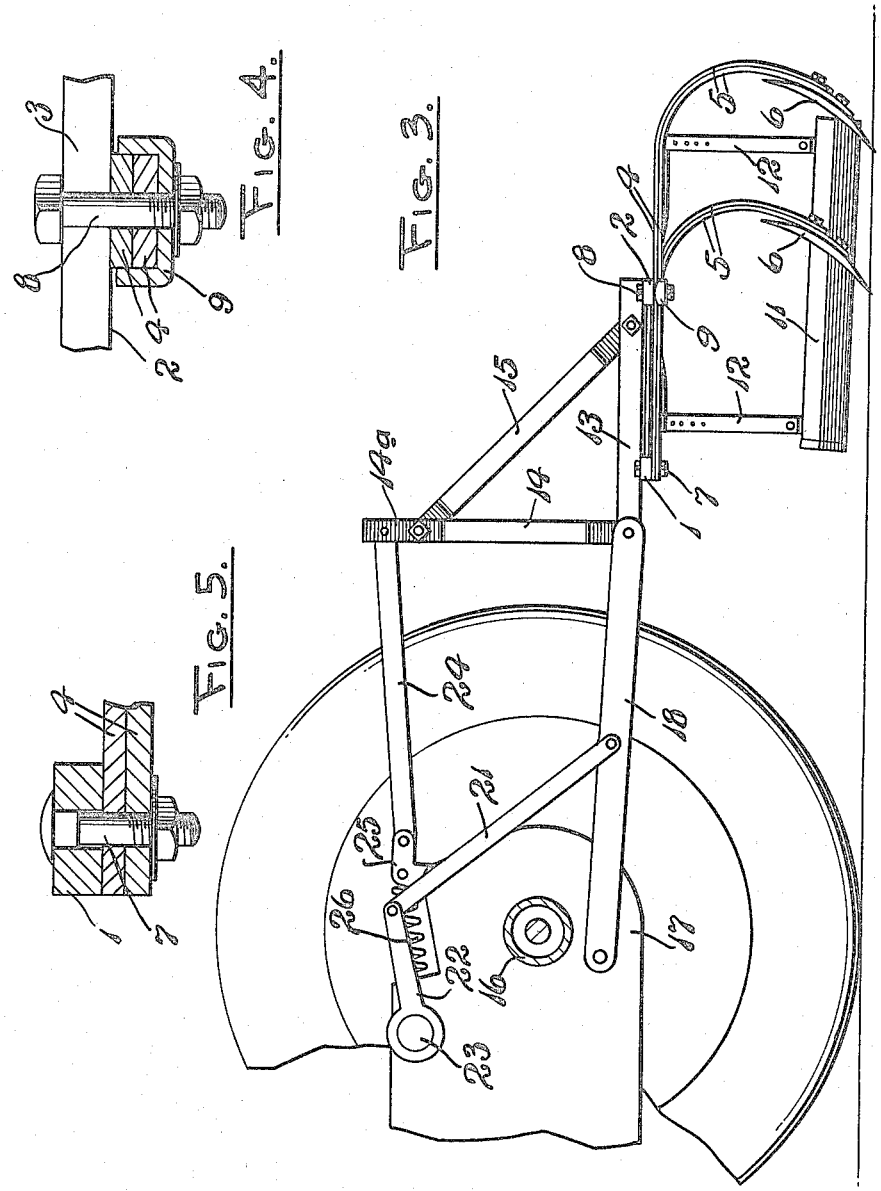

Patented July 21, 1953

2,645,989

UNITED STATES PATENT OFFICE 2,645,989

CULTIVATOR ATTACHMENT FOR TRACTORS

Gerrit Prince, West Olive, Mich., assignor to Rodger F. Becker, Kalamazoo, Mich.

Application March 20, 1950, Serial No. 150,679

1 Claim. (Cl. 97—47.61)

This invention relates to a novel, and particularly useful cultivator attachment for tractors by means of which crops may be cultivated. The attachment which, when at the back of a tractor, is raised when not in use and lowered for cultivating when wanted, is a strong, durable and practical cultivator provided with means for adjustment for taking care of substantially all conditions met in the cultivating of crops which are planted in rows, or in fitting ground before planting. The cultivator has teeth which are independently adjustable, may be placed greater or less distances apart when wanted, placed closely in groups if wanted, and any of the teeth may be removed, should such removal be desired, to conform to conditions met with.

The entire attachment may be adjustably moved transversely of the tractor, so that it extends substantially to one side or the other thereof. Thus, ground normally inaccessible to tractors, such as beneath low hanging tree limbs, can be reached with ease by my cultivator mounted upon a conventional tractor. Insofar as I am aware, such is not the case with presently known cultivators of this general type.

It is a primary object and purpose of the present invention to provide a cultivator attachment of the type outlined which is of a practical and useful structure, and sturdy and durable and very effective in use. An understanding of the invention may be had from the following description, taken in connection with the accompanying drawings, in which, Fig. 1 is a plan view of the cultivator attachment, coupled with means indicated for securing it to a tractor.

Figure 2:
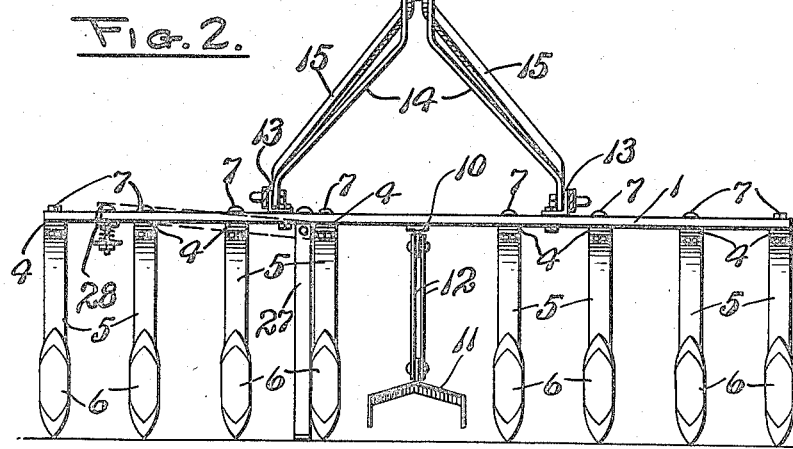

Fig. 2 is a front elevation of the attachment.

Figure 1:
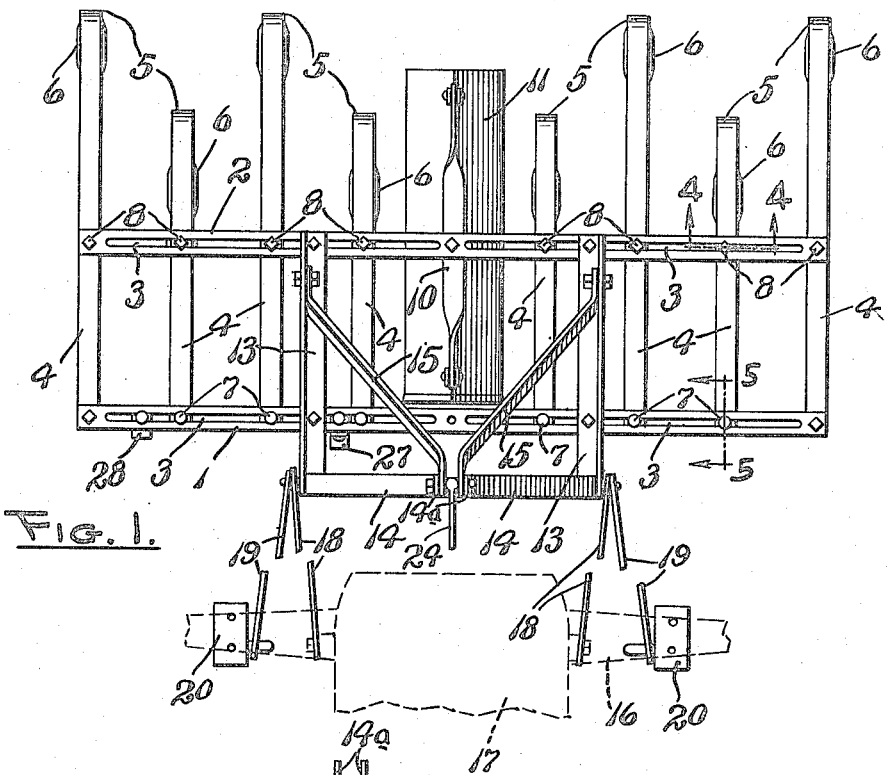

Fig. 3 is an end elevation of the attachment portions of the rear part of a tractor, and the connection means there-between and the cultivator attachment being shown, and Figs. 4 and 5 are, respectively, fragmentary longitudinal, vertical and transverse, vertical sections, on the planes of lines 4—4 and 5—5 of Fig. 1.

Like reference characters refer to like parts in the different figures of the drawings.

The cultivator attachment shown includes front and rear horizontal bars 1 and 2 spaced from and parallel to each other. Each bar is slotted from near each end toward, but short of, its middle, providing in each bar two slots 3 in alignment, closed at both ends. On the bars and below them cultivator teeth 6 are mounted. Such teeth, preferably, are mounted on spring members or tooth carriers made of two laminations of spring material, and each includes horizontal shanks 4 which at the rear ends are curved downwardly as indicated at 5, the usual, replaceable grounding engaging teeth 6 being connected at the lower ends by bolts or other suitable connections. The horizontal portions or shanks 4 in alternate spring members are of different lengths as shown.

Such cultivator spring members are independently adjustable to different positions in the lengths of the bars 1 and 3, except those at the ends of the bars. All are detachable from the bars and, if wanted, the end spring members may be removed. Bolts 7 extend downwardly through the slots 3 of the bar 1 and through holes in the front ends of the shanks 4, and have releasable securing nuts at their lower ends as shown in Fig. 5. Other bolts 8 extend downwardly through the slots 3 in the rear bar 2, and through the shank portions 4 of the spring members on which the teeth 6 are secured, and also through U-shaped clips 9, receiving tightening nuts at their lower ends to releasably clamp the spring members to the rear bar.

It is obvious that by loosening the bolts 7 and 8 the cultivator spring members may be independently adjusted for separation from each other, or may be collected in groups or otherwise arranged, or some of the spring members may be removed. All conditions which are met in cultivating crops planted in rows, and with the rows different distances apart are taken care of irrespective of the fact that the tractor which draws the cultivator attachment is not altered or changed. Thus in cultivating different crops in rows, as beans, in which the rows are closer together than corn rows, or with other crops like celery or onions, in which the distances between successive rows are variable, all may be taken care of by proper adjustment and arrangement of the spring members which are independently adjustable substantially the full length of the bars 1 and 2.

At the middle of the bars 1 and 2, a bar 10 is bolted from which an inverted channel shaped guard 11 of sheet metal is suspended by means of suspending bars 12. Such bars 12 are provided with independent means for vertical adjustment at their upper portions so as to raise the guard, either bodily or at either end, in correspondence with the height of the plants in a row over which the guard passes. Such guard or shield may be removed and replaced by an additional spring tooth.

At the upper side of the bars 1 and 2 horizontal bars or members 13 are secured by means of bolts passing through the slots 3. It is apparent that such bars 13 may be centrally located as shown in Fig. 1 with respect to the bars 1 and 2, or that the bars 1 and 2 and spring members attached thereto may be shifted longitudinally to different positions and secured in any desired position.

The front ends of the bars 13 extend a short distance ahead of the front bar 1. At such front ends two flat bars 14 are secured thereto at their lower ends, extending upwardly and being bent to converge inwardly toward each other, and terminate in spaced upwardly extending arms 14a as best shown in Fig. 2. Bracing bars 15 or flat metal are bolted or otherwise secured at their upper ends to the arms 14a, and extend downwardly and to the rear, and are bent to diverge outwardly from each other to connect at their lower ends with the rear end portions of the bars 13.

The cultivator attachment described is adapted to be drawn at the rear end of a tractor, fragmentary portions of which are shown in Fig. 3. As in substantially all tractors, there is a rear axle housing 16, centrally disposed in which is a differential housing 17. Link bars 18 are pivotally connected at their front ends one at each side of the differential housing 17. They extend to the rear and at their rear ends are pivotally attached by means of pins, as shown, to the frame provided by the bars 13, 14 and 15, at the lower ends of the bars 14, as shown in Fig. 3. Likewise other bars 19 are similarly attached at their front ends to clamps 20 which are mounted on the axle housing 16, one at each side of and spaced from the differential housing 17 (Fig. 1) and at their rear ends to the same pins with which the rear ends of the bars 18 are connected.

Links 21, pivotally connected at their lower ends, one to each of the bars 18 between the ends thereof, extend upwardly and forwardly and at their upper ends are pivotally connected to crank arms 22 on a rock shaft 23 which is a part of the tractor structure with which my invention is adapted to be used. The rock shaft 23 is rocked by the operator of the tractor through a conventional hydraulic mechanism to be operated by the engine through gearing in the differential housing to raise and lower the bars 18 and thus lift or lower the cultivator attachment. A bar 24 is pivotally connected at its rear end to, and is between, the two upwardly extending substantially parallel arms 14a, and at its front end to a bell crank 25, mounted on the differential housing, which is normally turned to the rear by a heavy compression spring 26 as shown.

A carrying post 27 is pivotally secured at its upper end to one of the slotted, horizontal bars 1 and 2, here the front bar 1, for movement about a horizontal axis from a substantially vertical position to a substantially horizontal position. When the post 27 is in the vertical position, it preferably extends downwardly below the guard 11, thereby raising the bars 1 and 2, and the spring members secured thereto above their normal positions.

A spring backed, support bracket 28 is secured to the bar 1 by means such as a bolt extending through the slot 3 therein for engaging and holding the post 27 in the horizontal position.

I claim:

In a spring harrow construction for attachment to a lift-type tractor, the combination comprising: a pair of spaced-apart, horizontal, front and rear parallel bars, each of said bars being slotted from points adjacent the ends of each thereof to points closely adjacent the middle points of said bars, whereby each bar has two longitudinal slots in alignment with each other and separated a short distance from each other at the inner ends and closed at their outer ends; a plurality of spring members having teeth therein spaced from each other and located transversely of said bars, one at each of the outer ends thereof and others intermediate said outer members, and means extending through one of the said slots in each of said bars and engaging each of said spring members for fastening each thereof in selected positions along the length of said parallel bars and, when so fixed in position, for constituting in cooperation with said parallel bars a rigid frame member; a sub-frame comprising a pair of angle members disposed and spaced in parallel relation with each other and transversely of said parallel bars; means extending through said slots and engaging said angle members for affixing same in selected positions on said parallel bars, and means mounted directly on said angle members providing three points arranged in a vertical plane for attachment to the lifting mechanism of said tractor.

GERRIT PRINCE.

References Cited in the file of this patent

UNITED STATES PATENTS

| Number | Name | Date |
|---|---|---|
| 411,470 | Piland | Sept. 24, 1889 |
| 438,153 | Harrell | Oct. 14, 1890 |
| 1,316,325 | Reynolds | Sept. 16, 1919 |
| 1,906,430 | Strehlow | May 2, 1933 |
| 2,140,712 | Mitchell | Dec. 20, 1938 |
| 2,363,749 | Rude | Nov. 28, 1944 |
| 2,562,486 | Denning | July 31, 1951 |

FOREIGN PATENTS

| Number | Country | Date |
|---|---|---|
| 549,114 | Great Britain | Nov. 6, 1942 |